US009282173B2

(12) United States Patent
Hidai

(10) Patent No.: US 9,282,173 B2
(45) Date of Patent: Mar. 8, 2016

(54) RECONFIGURABLE PACKET HEADER PARSING

(71) Applicant: JDS Uniphase Corporation, Milpitas, CA (US)

(72) Inventor: Takashi Hidai, Palo Alto, CA (US)

(73) Assignee: Viavi Solutions Inc., Milpitas, CA (US)

( * ) Notice: Subject to any disclaimer, the term of this patent is extended or adjusted under 35 U.S.C. 154(b) by 314 days.

(21) Appl. No.: 13/770,505

(22) Filed: Feb. 19, 2013

(65) Prior Publication Data
US 2013/0215906 A1  Aug. 22, 2013

Related U.S. Application Data

(60) Provisional application No. 61/600,502, filed on Feb. 17, 2012.

(51) Int. Cl.
H04L 29/06 (2006.01)
(52) U.S. Cl.
CPC ............... *H04L 69/22* (2013.01); *H04L 69/12* (2013.01)
(58) Field of Classification Search
CPC ............ H04N 1/0022; H04N 1/32789; H04N 2201/0093; H04W 74/0808; H04W 74/0816; H04L 12/2697; H04L 63/08; H04L 69/22; H04L 69/12
See application file for complete search history.

(56) References Cited

U.S. PATENT DOCUMENTS

| | | | |
|---|---|---|---|
| 5,687,378 A * | 11/1997 | Mulchandani et al. ........ | 717/131 |
| 6,427,169 B1 | 7/2002 | Elzur ............................ | 709/224 |
| 6,904,057 B2 | 6/2005 | Sarkinen et al. .............. | 370/469 |
| 7,236,492 B2 | 6/2007 | Davis et al. ................... | 370/392 |
| 8,661,292 B2 * | 2/2014 | Stevens et al. ................ | 714/27 |
| 8,867,568 B2 * | 10/2014 | Rubin et al. .................. | 370/474 |
| 2003/0007489 A1 | 1/2003 | Krishnan et al. ............. | 370/392 |
| 2003/0108038 A1 | 6/2003 | Devanagondi et al. ....... | 370/389 |
| 2003/0118022 A1 | 6/2003 | Kulkarni et al. .............. | 370/392 |
| 2005/0238012 A1 | 10/2005 | Panaigrahy et al. .......... | 370/389 |
| 2008/0130648 A1* | 6/2008 | Ra et al. ........................ | 370/392 |
| 2010/0322266 A1 | 12/2010 | Kropp ........................... | 370/469 |
| 2012/0159132 A1 | 6/2012 | Abel et al. ..................... | 712/229 |
| 2012/0195208 A1 | 8/2012 | Abel et al. ..................... | 370/252 |

OTHER PUBLICATIONS

Rama Mwikalo, "Efficient packet header parsing using an embedded configurable packet engine", Posted: Mar. 1, 2008. Website http://www.techdesignforums.com/practice/technique/efficient-packet-header-parsing-using-an-embedded-configurable-packet-engine/.

* cited by examiner

*Primary Examiner* — Ayaz Sheikh
*Assistant Examiner* — Debebe Asefa
(74) *Attorney, Agent, or Firm* — Harrity & Harrity, LLP

(57) ABSTRACT

The invention relates to a method and device for configurable parsing of packet headers in a network. A configurable packet header parser (CPHP) includes hard-coded packet header logic implementing a hard-coded state machine and a reconfigurable header parsing logic that is coupled to the hard-coded logic and includes programmable registers. The CPHP is remotely programmable by means of a command packet parser that may receive command packets carrying CPHP configuration data and program the registers with the CPHP data to enable parsing packet including new types of headers. The hybrid hard-coded/programmable CPHP requires only a relatively small number of programmable elements enabling ASIC-based implementation.

20 Claims, 11 Drawing Sheets

RECONFIGURABLE PACKET HEADER PARSING

CROSS-REFERENCE TO RELATED APPLICATIONS

The present invention claims priority from U.S. Provisional Patent Application No. 61/600,502 filed Feb. 17, 2012, which is incorporated herein by reference.

TECHNICAL FIELD

The present invention relates generally to networking and communications technology, and more particularly to methods and devices for reconfigurable parsing of data packet headers in a network.

BACKGROUND OF THE INVENTION

Modern communication networks transmit information in the form of data packets or frames that are encapsulated using a plurality of different network protocols that are typically referred to as a protocol stack, with each protocol typically adding to the packet its own header. As protocol stacks associated with different packets may differ from packet to packet, for example in dependence upon type of the service provided by the packets, location of their source in the network, and equipment used to generate the packets, packet headers and their order may also differ between packets. A typical data packet may include one or more headers associated with one or more protocols of the data link Layer, or Layer 2 of the OSI model, followed by one or more headers associated with one or more protocols of the Network Layer, or Layer 3 of the OSI model, and one or more headers associated with one or more protocols of the Transport Layer, or Layer 32 of the OSI model. By way of example, an Ethernet packet may include an Ethernet, or MAC header, followed by an IP header, followed by TCP or UDP header. However, a plurality of other network protocols, including proprietary protocols of various network equipment vendors, can also be included in the protocol stack of a particular packet, adding their own headers.

Various network equipment may be required to extract information containing in one or more headers of the packet, for example for routing or network monitoring purposes. Accordingly, such equipment includes a packet header parser (PHP) that is tasked with identifying each of the packet headers, and optionally specific fields therein, to enable further packet processing, filtering and/or routing. Software running on a general purpose processor may be able to locate and extract the needed header information, provided that the physical line rates are sufficiently low, such as DS3 and below. Packets transmitted over physical links with higher rates such as OC-48 and above, however, require special purpose hardware such as network processors or ASICs to accomplish the aforementioned format-specific processing operations.

Accordingly, when large line rates such as 1 GB/s and beyond are to be accommodated, Ethernet packet header parsing logic is typically implemented in an ASIC with a hard coded real time state machine to parse any potential Ethernet packet headers, such as MAC/IP/UDP headers, from a predetermined list of protocols to make the entire logic size to be reasonably small. The output of the packet header parser may be a pre-assigned header type number and a relative word offset for each header. One drawback of this approach is that a hard coded header parsing state machine is not able to support networks protocols that are not pre-coded therein, such as any future protocol that is yet unknown at the time of the parser design but which may appear after the ASIC/product is released. Although software-based packet header parsers can potentially be re-programmed, they are considerably slower and/or more complex, less compact and consume more power than ASIC-based hard-coded parsers, and therefore cannot be used in small network modules such as SFP transceivers and SFProbes™. Another drawback of prior art packet header parsers is that, when such parsers are used in field-deployed network equipment, even if implemented using a programmable logic, their re-programming requires deploying a skilled technician in the field.

Accordingly, an object of this invention is to provide a reconfigurable PHP that adds a degree of flexibility and reconfigurability to a hard coded PHP state machine to be able to accommodate new types of protocol headers. Another object of this invention is to provide a fast and efficient PHP that can be re-configured remotely.

SUMMARY OF THE INVENTION

Accordingly, one aspect of present invention provides a remotely configurable packet header parser (CPHP), comprising: a CPHP command packet parser for identifying and parsing a CPHP command packet received from a network, the CPHP command packet comprising CPHP configuration data; programmable memory registers coupled to the command packet parser for storing the CPHP configuration data; and, a reconfigurable packet parsing engine (RPPE) coupled to the programmable registers for parsing headers of data packets received from the network in dependence upon the CPHP configuration data stored in the one or more programmable registers.

In one aspect of the present invention, the RPPE comprises a hard coded header parsing logic implementing a hardcoded state machine for identifying headers of a plurality of predetermined default header types and header transitions in a received data packet, and for outputting header type numbers for identified headers, and a programmable header parser logic comprising one or more new header logics (NHL) each coupled to one or more of the programmable memory registers.

According to a feature of the present invention, the CPHP of claim comprises a plurality of default header logic (DHL) for parsing packet headers of the plurality of default header types, and one or more programmable new header logics (NHL) for parsing new header types as defined by the configuration data in received command packet. The plurality of DHLs may comprise a first DHL for parsing headers of a first default header type, and a plurality of second DHLs for parsing headers of a plurality of second default header types in response to a trigger from the first DHL, wherein header type identifiers of the first default header type and the second default header types are hard-coded in the first and second DHLs. The first DHL is configured for: receiving a data packet from the network, identifying therein a first header of the first default header type, parsing the first header to identify a header type of a next header in the data packet by selecting among the plurality of the second default header types, and triggering one of the second DHLs associated with the selected second default header type for parsing the next header in the data packet. The plurality of DHLs comprise the hard-coded packet parsing logic. The programmable packet parser logic includes a programmable comparator added to and/or functionally incorporated into the first DHL and coupled to a programmable NHID register for triggering one of the NHLs if the header type of the next header corresponds to a next header type ID (NHID) value stored in the programmable NHID register.

One aspect of the present invention provides a method for configurable parsing of packet headers of data packets in a network device, comprising: a) providing the network device with a command packet processor, a plurality of programmable registers, and a reconfigurable packet header processing engine (RPHPE) coupled to the programmable registers; b) sending to the device a command packet comprising header parser configuration data; c) receiving the command packet at the device; d) using the command packet processor for parsing the command packet and for extracting the header parser configuration data therefrom; e) saving header parser configuration data in the programmable memory registers; and, f) using the RPHPE for parsing headers of data packets received from the network in dependence upon the configuration data stored in the programmable registers.

BRIEF DESCRIPTION OF THE DRAWINGS

The invention will be described in greater detail with reference to the accompanying drawings which represent preferred embodiments thereof, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
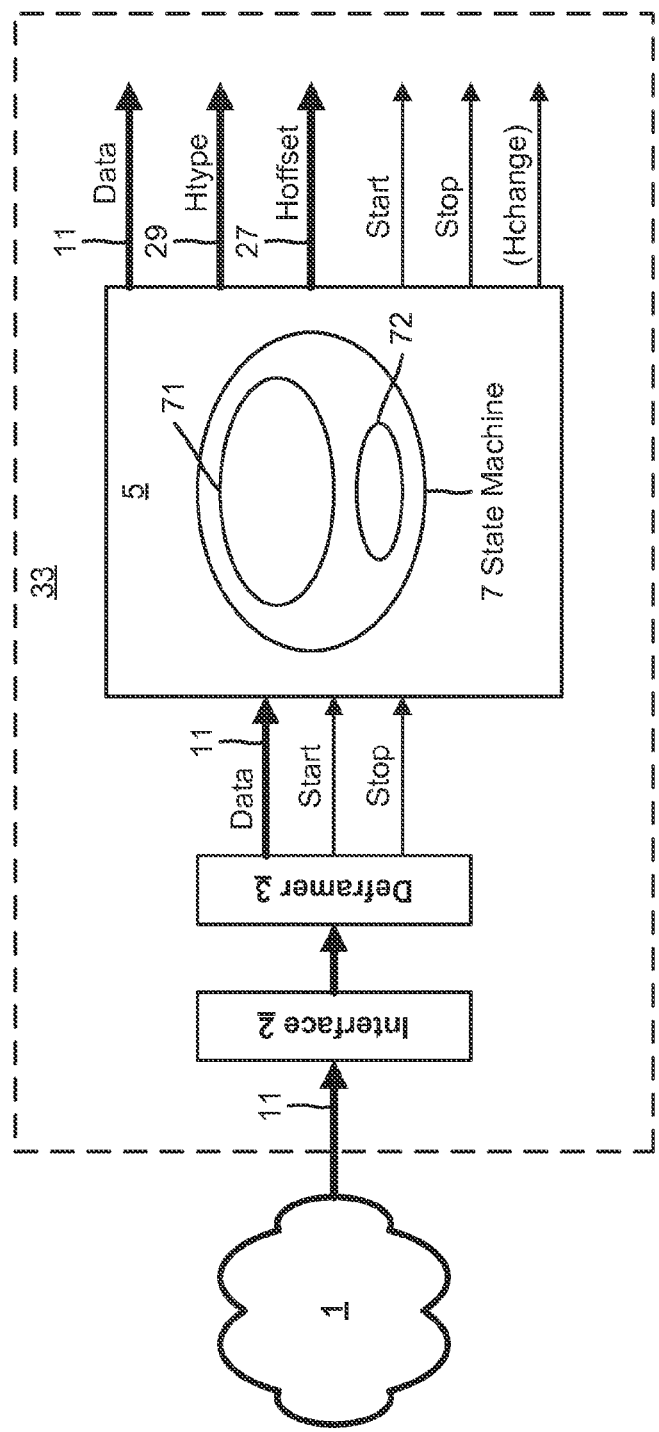
FIG. 1 is a diagram schematically illustrating a network device including a packet header parser having a hybrid header parsing engine.

Note that as used herein, the terms "first", "second" and so forth are not intended to imply sequential ordering, but rather are intended to distinguish one element from another unless explicitly stated. The terms "packet" and "frame" are used herein interchangeably and encompass data units associated with any network protocols. The term 'word' as used herein refers to a unit length of a packet that may be represented in bits or bytes, and may be for example equal to 16 bits, or 2 bytes, but may also be implementation- or protocol-dependent. Furthermore, the following abbreviations may be used:

ASIC Application Specific Integrated Circuit
FPGA Field Programmable Gate Array
UDP User Datagram Protocol
DSP Digital Signal Processor
CPU Central Processing Unit
IP Internet Protocol
MAC Media Access Control
GRE Generic Routing Encapsulation
MPLS Multiprotocol Label Switching
VLAN Virtual Local Area Network
ARP Address Resolution Protocol
TCP Transmission Control Protocol With reference to FIG. 1, there is schematically illustrated a portion of a network or host device 33 that includes a packet header processor (PHP) 5 in accordance with one embodiment. The network device 33 includes a network interface 2, a deframer 3, and the PHP 5, which may be followed by various application-specific filters, decoders and other modules (not shown). The terms 'network device' and 'host device' are used herein interchangeably and mean any device that receives data packets from the network and requires packet header parsing to perform its function, including but not limited to two-way pass-through devices such as network probes. In operation, input packets 11 that are received from a network 1 at the network interface 2 are forwarded to the deframer 3 for de-framing as known in the art. PHP 5 receives from the deframer 3 the input data packets 11, and may also receive 'Start' and 'Stop' signals indicating the beginning and the end of each packet. PHP 5 implements a state machine 7 that is configured for identifying each of the packet headers in the input packets in their sequential order. In one embodiment, each packet header type that may be encountered by PHP 5 is pre-assigned a header type number (HN) 'Htype'; when a packet header is recognized by the state machine 7 of PHP 5, its Htype is passed to the output. According to an aspect of the present invention, the state machine 7 of the PHP 5 may incorporate a hard-coded state machine 71 and a smaller programmable state machine portion or logic 72 that is coupled to the hard-coded state machine 71 so as to add a degree of reconfigurability to the state machine 7. The term hard-coded as used herein refers to logical circuits that are implemented in hardware or firmware that cannot be modified or reconfigured after the device is put in operation.

Figure 2:
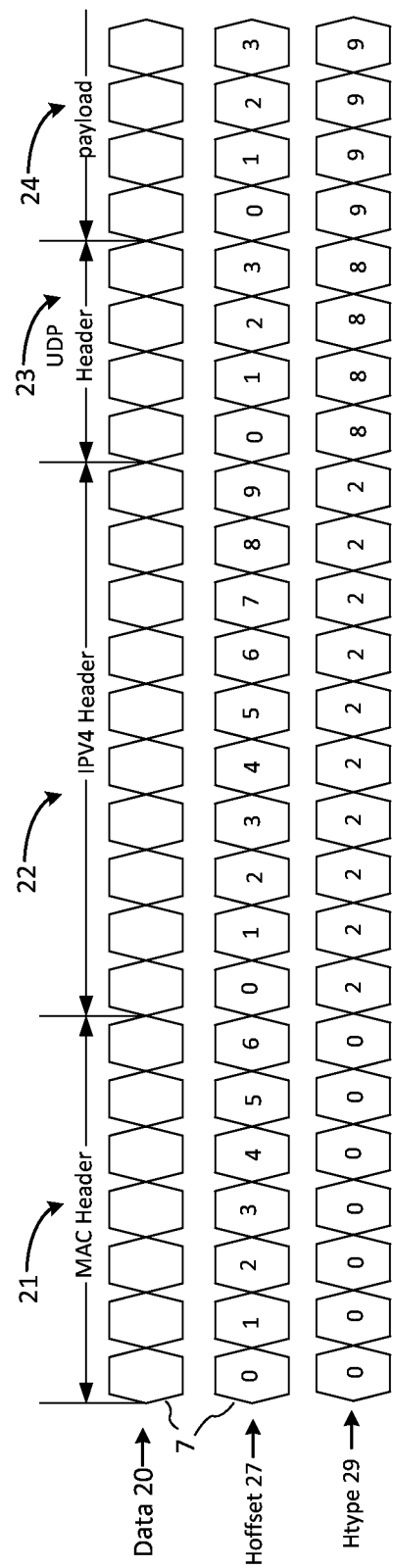
FIG. 2 is a schematic diagram illustrating data, header type and relative offset outputs of a packet header parser.

FIG. 2 schematically illustrates an exemplary packet 20 of the input data packets 11, with hexagons 7 representing 'words' of the packet. In the shown example, packet 20 includes a MAC header 21 that is 7 words long, an IPv4 header 22 that is 10 words long, a UDP header 23 that is 4 words long, and a payload 24. In each header, a variable 'Hoffset' 27 identifies a relative word offset for each word of the header, counting from the start of the header. By way of example, the MAC header 21 is assigned the heard type number 'Htype'=0, the IPv4 header 22 has the header type number 'Htype'=2, and the UDP header 23 has the header type number 'Htype'=8.

Referring to FIGS. 1 and 2, in one embodiment for each word of the received packet 20, PHP 5 outputs the word itself, the header type number 'Htype' 29 of the corresponding identified header, and the relative word offset 'Hoffset' 27 within the header. PHP 5 may also output the packet 'Start' and 'Stop' indicators, and optionally a header change or header transition indicator 'Hchange' delineating adjacent headers.

Headers associated with various protocols may include a 'next header type ID' (NHID) field that contains information indicating the header type, i.e. header type ID (HID) of the next header within the packet; the data content of these fields, 'NHID', is used by the state machine 7 to identify header transitions within a packet. Note that NHID value may differ from the header type number 'Htype' of the following header. By way of example, Htype may be an 8 bit word, while NHID may be a 16 bit word, such as EtherType in a MAC header, or an 8 bit word, such as 'IP Protocol' bits in an IP header.

For example, in the MAC header 21 the NHID field is typically the $7^{th}$ word of the header, and is referred to in the art as EtherType. EtherType is a two-octet (16 bits) field in the MAC header of an Ethernet frame, and is used to indicate which protocol is encapsulated in the payload of an Ethernet Frame. By way of example, EtherType=0x0800 indicates that the next header after the MAC header is the IPv4 header, EtherType=0x86dd indicates that the next header is the IPv6 header, EtherType=0x0806 indicates an ARP header, and so on as known in the art for a plurality of prior-art protocols. Further by way of example, EtherType is contained in the second word of a GRE header, and in the last word of a VLAN header.

Similarly, the NHID field in an IP header, such as the IPv4 header 22, defines the protocol used in the data portion of the IP datagram, and is referred to herein as the 'IP protocol' field. The 'IP protocol' field corresponds to the LS (least significant) byte of the $5^{th}$ word of the IPv4 header 22, and to the MS (most significant) byte of the $4^{th}$ word of a IPv6 header.

HNID may also be port number related, for example in headers associated with the Transport Layer protocols ($4^{th}$ Layer of the OSI model), such as the UDP and TCP. By way of example, the $1^{st}$ and $2^{nd}$ words of a UDP header contain source (SRC) and destination (DST) port numbers, which values are indicative of the protocol encapsulated in the UDP datagram. By way of example, SRC Port==1701 or DST Port==1701 points to L2TP as the encapsulated protocol, so that the UDP header is followed by a L2TP header.

Figure 3:
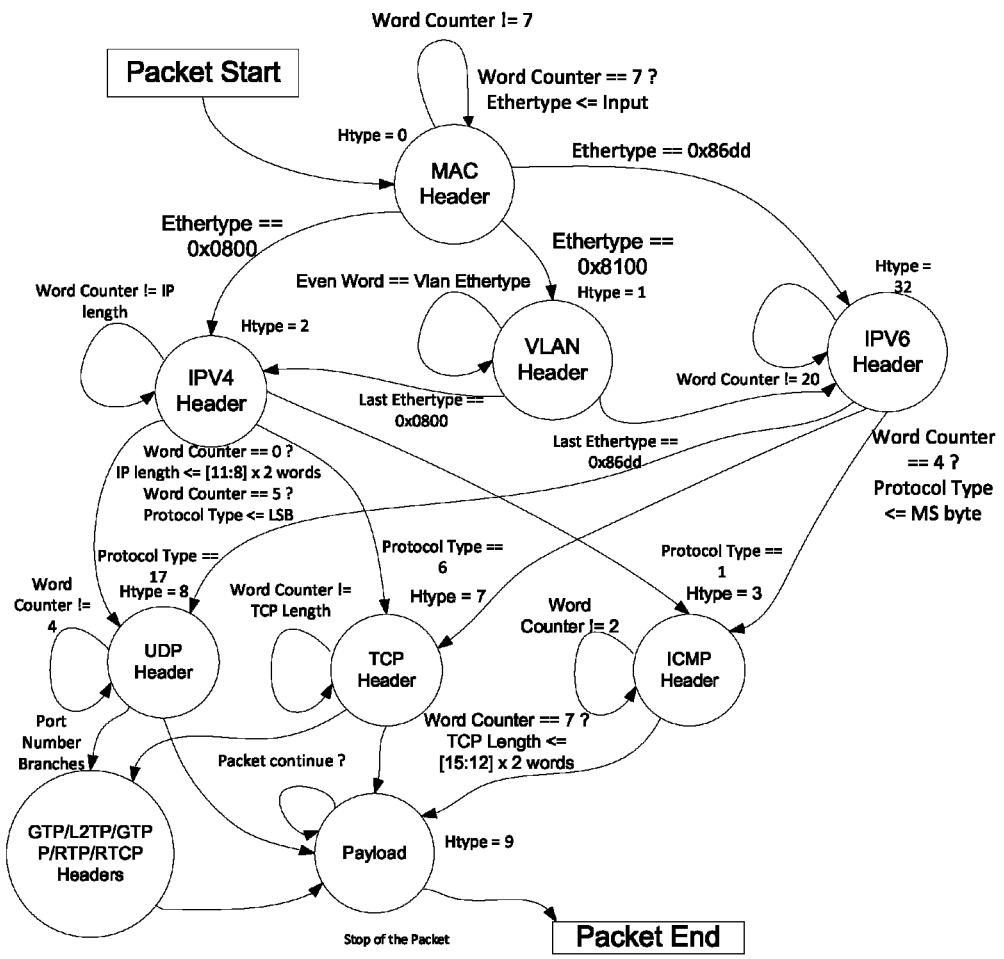
FIG. 3 is a schematic diagram illustrating a state machine of a packet header parser according to prior art.

With reference to FIG. 3, there is illustrated an exemplary embodiment of the state machine 7 that is hard-coded to parse packets that may include only certain pre-defined headers and header transitions, as illustrated in the figure. More particularly, in this example a MAC header may be followed by one or more of the following headers: an IPv4 header, an IPv6 header and/or an VLAN header, as defined by the EtherType field of the MAC header, while the IPv4 and IPv6 headers may be followed by one of a UDP header, a TCP header or a ICMP header, as defined in the 'IP protocol' field of the corresponding IP header. Finally, the UDP and TCP headers may be followed by headers associated with GTP (GPRS Tunneling Protocol), L2TP (Layer 2 Tunneling Protocol), GTPP (Generic Tunneling Protocol Prime), RTP (Real-time Transport Protocol), and RTCP (RTP Control Protocol), as indicated by the port numbers in the NHID fields of the UDP and TCP headers.

The exemplary state machine of FIG. 3 is however unable to parse packets that contain headers associated with any other protocol that is not indicated in the figure, and must be reconfigured to support additional protocols or header transitions. Although a software-based or an FPGA-based state machine may potentially be reconfigured, for example reprogrammed, to accommodate new headers and/or new header transitions, such re-programming is generally not possible for prior art high-data-rate PHPs based on hard-coded state machines, such as those implemented using an ASIC.

Accordingly, one aspect of the present invention provides a configurable PHP (CPHP), which is "hybrid" in a sense that it combines a hard-coded packet header parser implementing a pre-configured state machine such as that shown in FIG. 3 by way of example, and also includes a field-reconfigurable packet parser logic that may be reserved to accommodate new additional headers and/or header transitions, including any new or additional EtherType, new 'IP Protocol' type, and new port numbers. Embodiments of the CPHP, and of the associated method for configurable parsing of packet headers of data packets in a network device, will now be described in further detail with reference to FIGS. 4-10.

Figure 4:
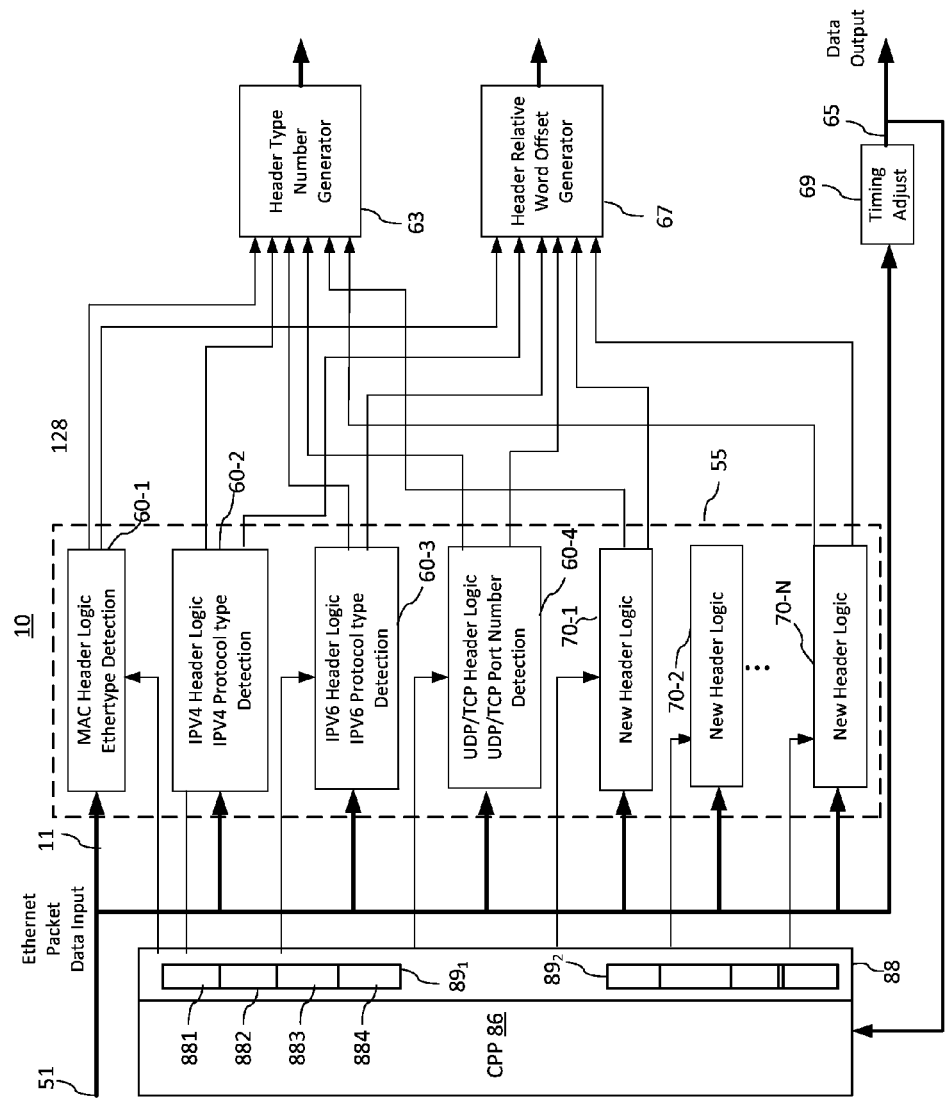
FIG. 4 is a schematic block diagram of a reconfigurable packet header parser (CPHP) according to an embodiment of the present invention.
Figure 5:
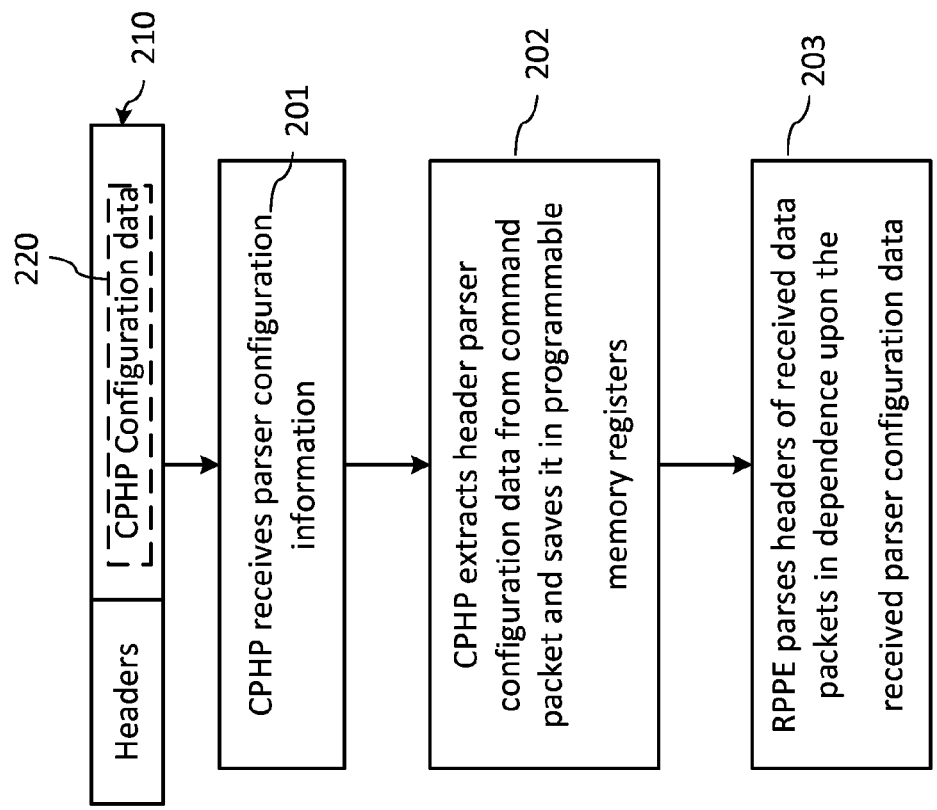
FIG. 5 is a flowchart illustrating a method for remotely configuring a packet header parser according to an embodiment of the present invention.
Figure 6:
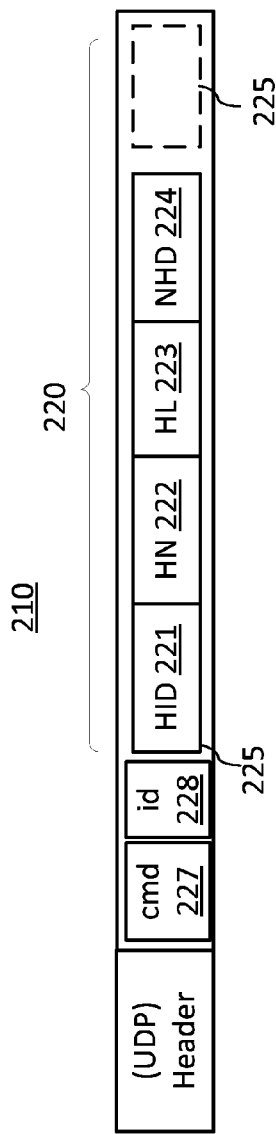
FIG. 6 is a schematic diagram illustrating a CPHP command packet containing PHP configuration information.

With reference to FIG. 4, there is illustrated a CPHP 10 according to an embodiment of the present invention. The CPHP 10 may be used as the PHP 5 of FIG. 1, and can be remotely configured and re-configured by means of a command packet 210, which is schematically shown in FIGS. 5 and 6 and which includes CPHP configuration data 220 in its payload. For that purpose, CPHP 10 is provided with a CPHP command packet parser 86, which is also referred to herein simply as the command packet parser (CPP) 86, for identifying and parsing the payload of the CPHP command packet received from the network, and one or more programmable memory registers 88 that are coupled to the command packet parser 86 for storing the CPHP configuration data. The CPHP 10 further includes a reconfigurable packet parsing engine (RPPE) 55, which is coupled to the programmable registers 88 and is configured for parsing headers of input packets 11 received from the network in dependence upon the CPHP configuration data stored in the programmable registers 88.

The RPPE 55 is formed substantially by a plurality of packet header logics represented by blocks 60-1 to 60-4 and 70-1, 70-2 and 70-N. Outputs of the header logics 60 and 70 are connected to a header type number generator 63 and a header relative offset generator 67, which collect the Htype and Hoffset values, respectively, from currently active header logics 60, 70 and output a stream of Htype and Hoffset data for the header stack of a packet being parsed by the RPPE 55. The data output 65 of the CPHP 10 may incorporate a timing adjustment logic 69 for adjusting the timing of the output data packets to account for delays in the CPHP 10 and to synchronize the data output with the Htype and Hoffset outputs of the blocks 63 and 67. Although not shown in the figure, outputs of the Htype and Hoffset generators 63, 67 are also fed back to the CPP 86 to assist in the parsing of the payload of the CPHP command packet 210. The packet header logics 60-1 to 60-4 are pre-configured, preferably hard-coded, for parsing a pre-defined set of packet header types, which are referred to herein as 'known headers' or 'default headers'. The packet header logics 60-1 to 60-4 are generally referred to herein as the default packet header logics (DHLs) 60. In the shown illustrative embodiment, the default header types include MAC, IPv4, IPv6, and UDP/TCP headers, so that the DHLs 60 include MAC header logic (MACHL) 60-1, IPv4 header logic (IPv4HL) 60-2, IPv6 header logic (IPv6HL) 60-3, and UDP/TCP header logic 60-4. Although shown as a single block in FIG. 3, the UDP/TCP header logic 60-4 may represent separate UDP header logic and TCP header logic.

It will be appreciated that the shown set of DHLs 60 is by way of example only, and other embodiments of CPHP 10 may include additional DHLs that are configured, for example hard-coded, to parse other known header types, including but not limited to headers associated with the following protocols: VLAN, GRE, HDLC, L2TP, PPP, SCTP, RTP, etc.

The RPPE 55 further incorporates a plurality of N new header logics (NHLs), of which only the first NHL 70-1, the second NHL 70-2, and the N-th NHL 70-N are shown, which are generally referred to herein as NHLs 70. NHLs 70 may not be associated with any particular header type by default, but could be programmed in operation to parse any additional or new header type not included in the default hard-coded set. The number N of the 'reserved' programmable NHL may vary from as few as one to as many as 10 or more, depending on the application and the available computational resources.

Accordingly, the RPPE 55 includes both hard coded packet parsing logic and programmable packet parser logic, and may also be referred to herein as a hybrid RPPE. The hard-coded packet parsing logic implements a hardcoded state machine that is configured to identify packet headers of a plurality of predetermined header types and pre-determined header transitions, and to output header type numbers (HN) 'Htype' and may also output word offsets 'Hoffset' for the identified headers. The programmable packet parser logic includes the one or more NHLs 70, each coupled to one or more of the programmable memory registers 88. Furthermore, the programmable packet parser logic may also include components functionally incorporated in one or more of the DHLs 60, such as a programmable comparator coupled to one of a programmable registers, as described hereinbelow.

All the blocks of the CPHP 10 shown in FIG. 4 may be embodied using a single hardware processor or using multiple hardware processors, either dedicated or shared with other functionalities of the host network device. In one currently preferred embodiment, all the blocks of CPHP 10 shown in FIG. 4, including hard-coded and programmable logics and programmable registers, are embodied in one or more ASICs incorporating hard-wired logic and programmable registers and gates.

Turning now to FIG. 5, an aspect of the present invention provides a method of remotely configuring the CPHP 10, which includes the following general steps. At step 201, CPHP 10 receives from network 1 a command packet 210 that includes header parser configuration data 220. At step 202, the command packet parser 86 parses the command packet 210 and extracts the header parser configuration data 220 therefrom, saving said data 220 in the programmable memory registers 88. This step may include parsing headers of the command packet 210 by the RPPE 55 for identifying it as a CPHP command packet, and then using the CPP 86 for parsing the payload of the command packet 210. At step 203, RPPE 55 is used to parse headers of data packets received from the network 1 in dependence upon the configuration data 220 stored in the programmable registers 88. In accordance with one aspect of the present invention, these steps are enabled by preceding steps of i) providing the host network device, such as the device 33 of FIG. 1, with the command packet processor 86, the plurality of programmable registers 88, and the reconfigurable packet header processing engine (RPHPE) 55 coupled to the programmable registers, and ii) sending to the device a command packet comprising header parser configuration data from a controller (not shown) that may be connected to the network 1 at a remote location from the host device 33.

The operation of CPHP 10 will now be described more in detail by way of example with reference to parsing Ethernet packets that include a MAC header as the first header of the protocol stack for the sake of clarity of the description. Parsing packets with one or more headers of other data-link Layer-2 protocols that replace, precede or follow the MAC header is also within the scope of the present invention, with relatively minor modifications to the described embodiments, which would be evident to those skilled in the art from the present description.

Referring again to FIG. 4, the programmable registers 88 may be empty initially, for example at start-up, in which case only the hard-coded portion of the RPPE 55 is operational, with the NHLs 70 being in a 'reserved' state. In this initial, or default, state the CPHP 10 can parse Ethernet packets including only the default header types that can be parsed by the DHLs 60. When such a packet is received at the data input 51 of the CPHP 10, it is forwarded to each of the DHLs 60 together with a 'packet start' indicator. Once one of the DHLs 60, for example MACHL 60-1, identifies a 'first' packet header of a first header type it is configured to parse, it outputs its header type identifier 'Htype', also referred to herein as the header type number (HN), to the header type number generator 63, and further outputs the relative word offsets in the header to the header word offset generator 67. DHL 60-1 is further configured to parse the first packet header to identify the NHID field in the header, determines the header type of the following (second) header in the packet, and sends a trigger signal to one of the other (second) DHL 60 that is configured for parsing headers of the corresponding header type. Once all headers of the received packet are parsed, the process is repeated for parsing a next packet.

Once a need arises to process Ethernet packets incorporating one or more new header types that are not included in the default header types hard-coded in the DHL 60, these one or more new header types are assigned new header type ID (HID) values, and, optionally, HID values for the next header (NHID) to follow the new header. A remote controller, which may be disposed at a remote location in the network, is then used to send the CPHP command packet 210 to or through the network device incorporating the CPHP 10.

With reference to FIG. 6, in one embodiment the CPHP command packet 210 includes a CPHP command word 227 and a host device identifier 228, which are used by the CPHP 10 to recognize the command packet 210 as a CPHP command packet that is directed to the host device for configuring the CPHP 10. The CPHP configuration data 220 included in the payload of the command packet 210 may vary in dependence on the number and type of new headers to be processed, but generally includes at least one new header descriptor (HD) 225 providing information related to the new header type. In one embodiment the HD 225 includes a next header descriptor (NHD) 224 containing information that to be used by the CPHP 10 for determining which header type is to follow the new header. In one embodiment the HD 225 further includes a header type identifier (HID) 221 for the new header, header length data (HL) 223 indicting the length of the new header, and header type number (HN) 222 for the new header. The next header descriptor 224 may be, for example, in the form of a header type number for the new header, or in the form of a next header ID offset (NHIDoffset) indicating the location of the next header ID field in the new header. Depending on a position of the new header(s) in the header stack of a data packet, or in other words on the encapsulating protocol, the HID 221 may be in the form of a new EtherType, a new 'IP Protocol type', or a new port number, as defined in corresponding fields of headers of various Layer 2, 3 and 4 protocols.

Referring back to FIG. 4, in one embodiment the programmable registers 88 include one or more HD registers 89 for storing the header descriptors 225 for a plurality of new header types. In one embodiment, the one or more HD registers 89 include one or more header ID registers 881 for storing HID 221 for new headers, one or more HN registers 882 for storing the header type numbers 222 for the new headers, one or more HL registers 883 for storing the header length data 223 for the new headers, and one or more NHD registers 884 for storing the next header descriptors 224 such as the header type number Htype for next headers. In one embodiment, the programmable registers 88 include N sets of these HD registers 89, each associated with, i.e. can be read by, one of the N NHLs 70, so that, for example, HD registers $89_1$ are associated with NHL 70-1, and HD registers $89_2$ are associated with NHL 70-2. By way of example, N=8, that is CPHP 10 includes 8 'reserved' NHLs 70 and 8 sets of HD registers 89 containing in total 8*4=24 programmable registers, so that CPHP 10 may be configured to process up to N=8 additional, or new, headers.

Figure 9:
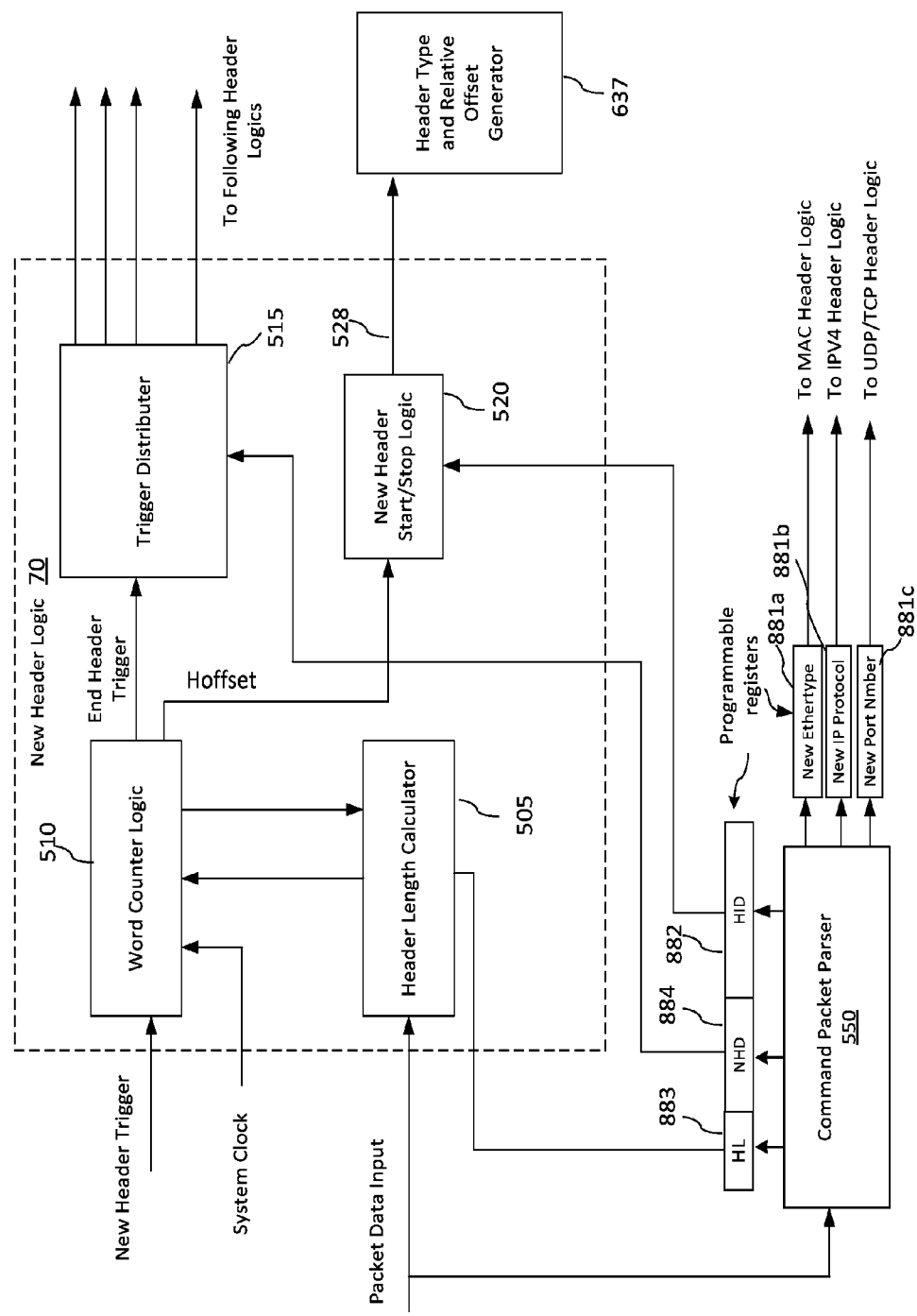
FIG. 9 is a schematic block diagram illustrating programmable new header parsing logic for parsing new headers.

Referring briefly to FIG. 9, the HID registers 881 may include one or more EtherType registers 881*a* for storing new EtherType values, one or more new IP Protocol registers 881*b* for storing new 'IP Protocol' values, and one or more Port Number registers 883*c* for storing new 'Port Number' values, which may be associated with different NHLs 70. In one embodiment, the CPP 86 parses the payload of the command packet 210 to extract therefrom HD values for one or more new headers, identifies whether the extracted HID is of the EtherType, IP Protocol, or Port Number type, and stores them in corresponding programmable registers 881*a*, 881*b* or 881*c*. Simultaneously, the LH, HN and NHD values for the new header are also stored in their respective programmable registers 882, 883, and 884.

Figure 7:
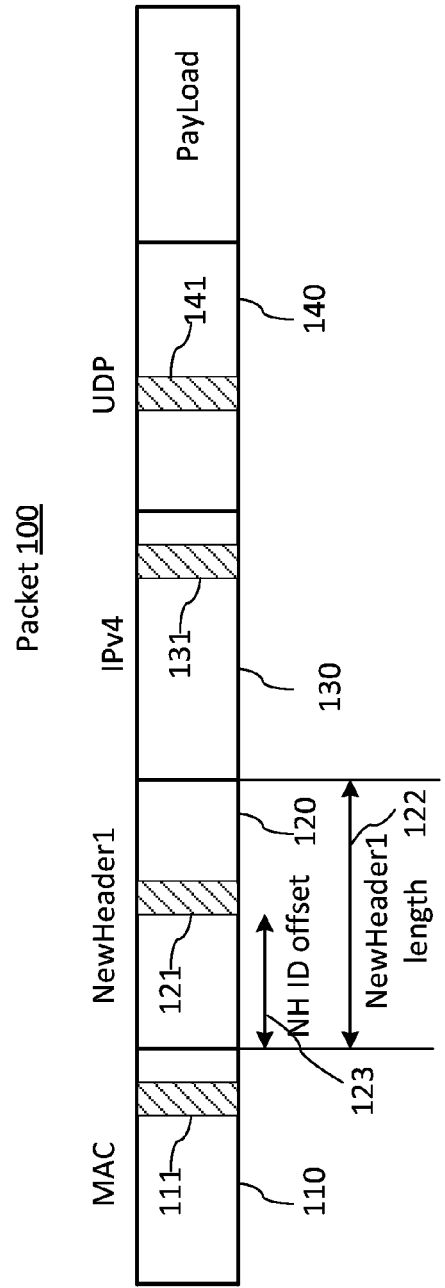
FIG. 7 is a schematic diagram illustrating an Ethernet packet including a new header.

Turning now again to FIG. 4 while referring also to FIGS. 7, 8 and 9, the configuration and operation of the CPHP 10 will now be described for an exemplary embodiment, wherein the CPHP 10 is being configured to parse packets that may incorporate a new header 120, of header type EtherType='NewHeader1', sandwiched between a MAC header 110 and an IPv4 header 130, such as the Ethernet packet 100 illustrated in FIG. 7, in addition to packets that include only the default headers. In the packet 100, the NHID/EtherType field 111 of the MAC header 110 contains the HID/EtherType value of the new header 120. In the exemplary embodiment now described, the CPHP command packet 210 includes HID 221 indicating the new EtherType, HN 222 indicating new 'Htype' value assigned to the new header 120, HL data 223 indicating the length 122 of the new header 120, and NHD 224 indicating the header type for a header that should follow the new header in the packet 100. In the illustrated embodiment, NHD 224 is in the form of the pre-assigned header type number Htype for IPv4 header, indicating to CPHP 10 that the new header 120, when present, is to be followed by the IPv4 header 130. Alternatively, NHD 224 may be in the form of the NHIDoffset 123 indicating the (word) offset of a NHID field 121 in the new header 120 which contains the 'next header ID' (NHID) value. At the CPHP 10, the CPHP command packet 210 is first passed through the RPPE 55, and then forwarded to the CPP 86 for parsing the payload thereof. If the command word 227 is recognized and accepted by the CPP 86, and the device ID 228 in the payload of the command packet 210 matches a device ID encoded in CPP 86, the CPP 86 captures the command and the related CPHP configuration information 220, and extracts the EtherType (HID), LH, HN, and NHD data for the new header 120 therefrom. These data are then saved in the corresponding programmable registers 881, 882, 883, and 884 that are associated with one of the NHLs 70, for example NHL 70-1.

Figure 8:
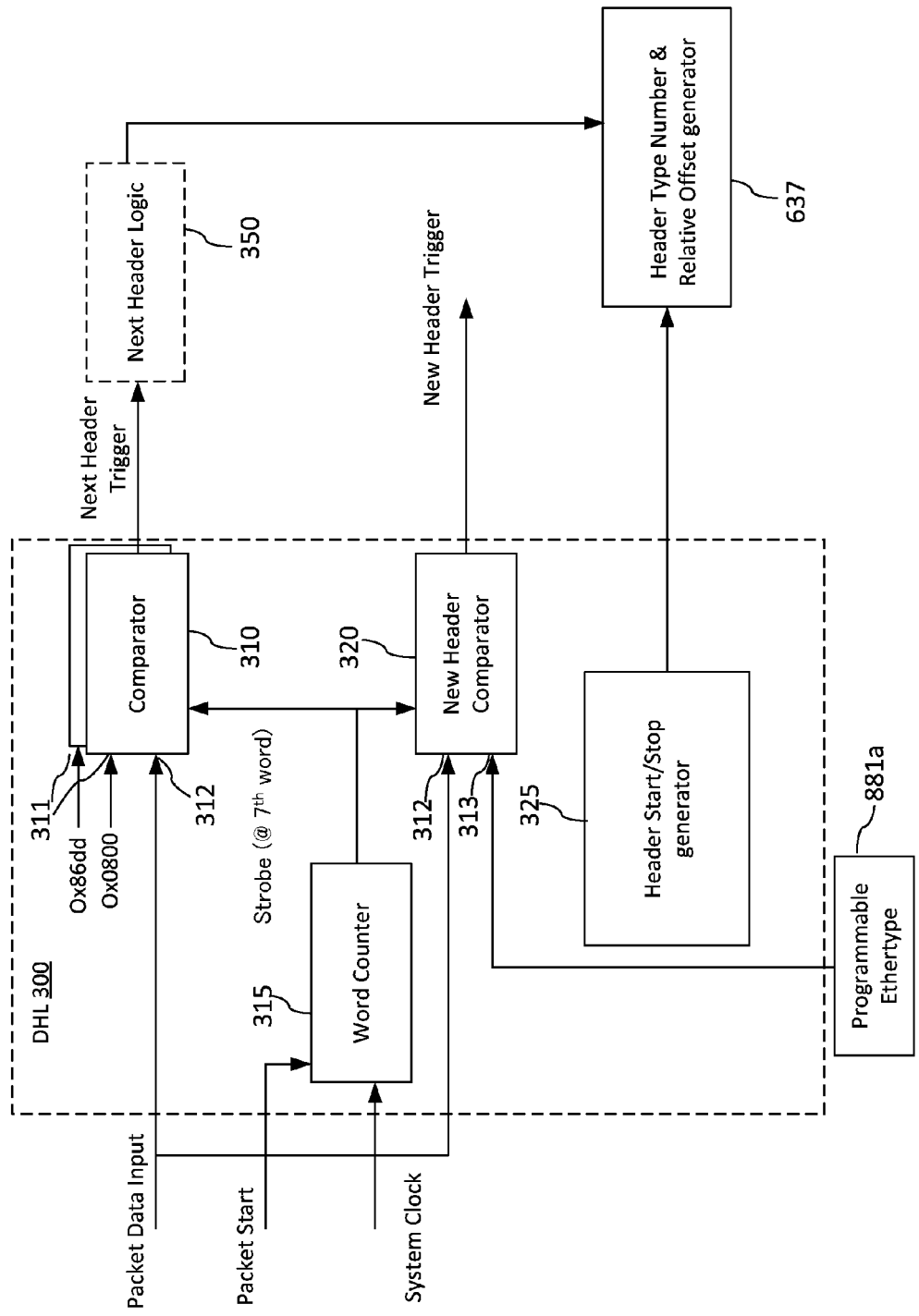
FIG. 8 is a schematic block diagram of a hybrid header parsing logic including hard-coded and reconfigurable portions for parsing 'default' Layer 2 or Layer 3 headers.

Turning now to FIG. 8, the parsing of packets 100 with the new header 120 will be first described hereinbelow with reference to an exemplary DHL 300, which is also referred to hereinbelow as the first DHL. It is configured for receiving a data packet from the network, identifying therein a first header of a first header type, parsing the first header to identify a header type of a next header in the data packet by selecting among a plurality of second default header types, and triggering one of a plurality of second DHLs corresponding to the selected second default header type, for parsing the next header in the data packet.

As illustrated, DHL 300 may be used to implement the MACHL 60-1 of the CPHP 10, or, with a few simple modifications described hereinbelow, as one of the IP DHLs 60-2, 60-3, or generally as any header logic for processing headers which header type is defined by EtherType or 'IP Protocol' values, such as VLAN, GRE, Hop-by-Hop, and the like. When DHL 300 embodies the MACHL 60-1, the first header type it is configured to parse is a MAC header type, and the a plurality of second default header types includes all default headers that can follow a MAC header, such as 'IPv4' and 'IPv6' header types in the illustrative embodiment of FIG. 4.

In accordance with an aspect of the present invention, DHL 300 incorporates a hard-coded portion and a programmable portion. The hard-coded portion is implemented using hard-coded logic circuits which cannot be modified in operation; it includes one or more default comparators 310 having data inputs 312 and hard-coded reference inputs 311, a word counter logic 315 which outputs the relative word offset values Hoffset to an Hoffset and Htype generator 637, and a header Start/Stop generator (HSSG) 325. In FIG. 9, the Hoffset and Htype generator 637 combines the functions of corresponding blocks 63 and 67 of FIG. 4. The plurality of the second default header types is defined by header IDs that are hard-coded at the reference inputs 311 of the default comparators 310. When the DHL 300 is used as the MACHL 60-1, the reference inputs 311 of the comparators 310 are hard-coded with default EtherType values such as 0x0800 and 0x86dd corresponding to IPv4 and IPv6, respectively. Each of the default comparators 310 may be hard-wired to send trigger signals to one of the plurality of the second DHLs that are associated with header types that may follow the first, i.e. MAC, header, which are referred to herein as the second default headers and which in the exemplary embodiment of FIG. 4 include the IP DHLs 60-2 and 60-3, respectively.

The programmable portion of the DHL 300 includes a programmable new header comparator (NHC) 320, which has a programmable reference input 313 that is coupled to one of the programmable registers 88, in the shown embodiment—to the EtherType register 881*a*, which contains the new EtherType for the new header 120.

In operation, an Ethernet packet, such as packet 100, that is received from the deframer 3 is sent to data inputs 312 of the default hard-wired comparators 310 and of the NHC 320. The word counter logic 315, which receives a system clock signal from the host device and a packet start signal from the deframer, generates a strobe signal at a time instant corresponding to the start of the NHID field 111 in the MAC header 110 of the received packet, and sends it to the comparators 310, 320. Each of the default comparators 310 are configured to compare the bits in the NHID field to a reference input 311, which is hard-coded with one of the default header IDs. In the exemplary embodiment of FIG. 8 two of the hard-coded comparators 310 are shown which have EtherType='0x0800' and '0x86dd' hard-coded at their respective reference inputs 311. In response to the strobe signal from the word counter logic 315, the comparators 310 and 320 compare signals at their data and reference inputs and generate a corresponding 'Next Header' trigger to one of the 'second DHLs' 60-2, 60-3 if the content of the NHID/EtherType field 111 coincides with one of the hard-coded inputs of the comparators. If the Ethertype field 111 of the MAC header 110 contains the HID/EtherType value 221 assigned to the new header 120 and stored in the programmable register 881a, the programmable comparator 320 generates a 'New Header Trigger' that is sent to one of the NHLs 70 such as the first NHL 70-1, which may be associated with the programmable register 881a.

Turning now to FIG. 9, there is illustrated a schematic block diagram of the new header logic 70 according to an embodiment of the present invention. It includes a word counter logic 510, that is similar in function and operation to the word counter logic 315 of the DHL 300, a header start/stop logic 520 that is similar in function and operation to the header start/stop logic 325 of DHL 300, a header length calculator 505, and a trigger distributer 515. The word counter logic 510 starts counting the words of the new header 120 when the 'new header trigger' signal is received from the MACHL 60-1; it compares the counter value and a header length value from the header length calculator 505, and when the counter reaches the value corresponding to the header length, the word counter logic 510 generates a "Header End" signal, which is then used as a 'next header' trigger signal for the next header by the trigger distributer 515. The trigger distributor 515 selects a next header logic from the DHLs 60 and the NHLs 70 based on the NHD values saved in the programmable register 884, such as the header type number Htype for the next header, and provides the 'next header' trigger to the selected header logic. By way of example, in the embodiment wherein the received packet is packet 100 of FIG. 6 and the NHD value stored in NHD register 884 corresponds to an IPv4 header, the trigger distributer 515 forwards the 'header end' trigger from the word counter logic 510 to the IPv4 DHL 60-2 of CPHP 10.

The new header start/stop logic 520 generates header start and stop signals for the new header being parsed by the NHL 70, and may further output the header type number (HN) 'Htype' and relative word offset 'Hoffset' for the header to the header type/offset generator 637, which in FIGS. 8, 9 combines both the header number type generator 63 and the header relative word offset generator 67 shown in FIG. 4.

In one embodiment, the HN value 'Htype' for the new header 120 is obtained from the command packet 210 by the CPP 86 and saved in the programmable register 882, wherefrom it is then read by the new header start/stop logic 520. In another embodiment, the header type number 'Htype' for the new header may be generated by the CPHP 10 based on the EtherType/HID value obtained from the command packet 210.

In one embodiment, the Htype and Hoffset outputs from the NHL 70 are inactive before the 'header start' signal and after the 'header stop' signal. In one embodiment, 'inactive' Htype and Hoffset outputs may be implemented as hi-impedance states, and may be wired-OR together to form a common Htype and Hoffset data bus 528 to the header type and relative offset generator 637.

The header length calculator logic 505 calculates or otherwise obtains the length of the new header 120 based on the HL data 223 stored in the LH programmable register 883. In one embodiment, the HL data 223 obtained from the command packet 210 includes a default header length, a length increment value, and a multiplier value, and the header length calculator logic 505 is configured to compute the header length by adding to the default header length the length increment value multiplied by the multiplier value. In one embodiment, HL data 223 includes a default header length, a word offset of header length tag, a multiplier and a multiplicand for the final header length. By way of example, the default header length=4, the word offset of length tag=2, the multiplier=LS byte×2, and the multiplicand=word (16 bit). The header length calculator 505 then finds the value of '4' at LS byte of 2nd word, and the new header length L 122 is then computed as 4+(4*2)=12 (words). Further by way of example, in the IPv4 case the "length tag" is 2nd MS nibble of 1st word. If the IPV4 header starts with 0x4500 . . . , the 2nd MS nibble— '5'—is the length tag; the multiplicand is 32 bit, and the default length for IPV4 header is 0. Therefore, the length of IPV4 header is 0+5×4 (byte)=20 bytes.

The 'end header' trigger signal from the word counter logic 510 serves as the trigger signal for the next header logic, for example the IPv4 DHL 60-2, for triggering the parsing of the next header, which in the case of packet 100 is the IPv4 header 130. The IPv4 DHL 60-2 may be embodied generally as the DHL 300 illustrated in FIG. 8, except that the reference inputs 311 of the comparators 310 are hard-coded (hard-wired) with the 'IP Protocol' values for the default headers that may be encapsulated by the IPv4 protocol, for example '0x11' for the UDP, and the word counter logic 315 generates the strobe signal at the 5$^{th}$ word of the IPv4 header corresponding to the 'IP Protocol' field 131 of the IPv4 header 130. Furthermore, the reference input 313 of the programmable comparator 320 is coupled to the 'IP protocol' programmable register 881b rather than the 'EtherType' programmable register 881a.

Figure 10:
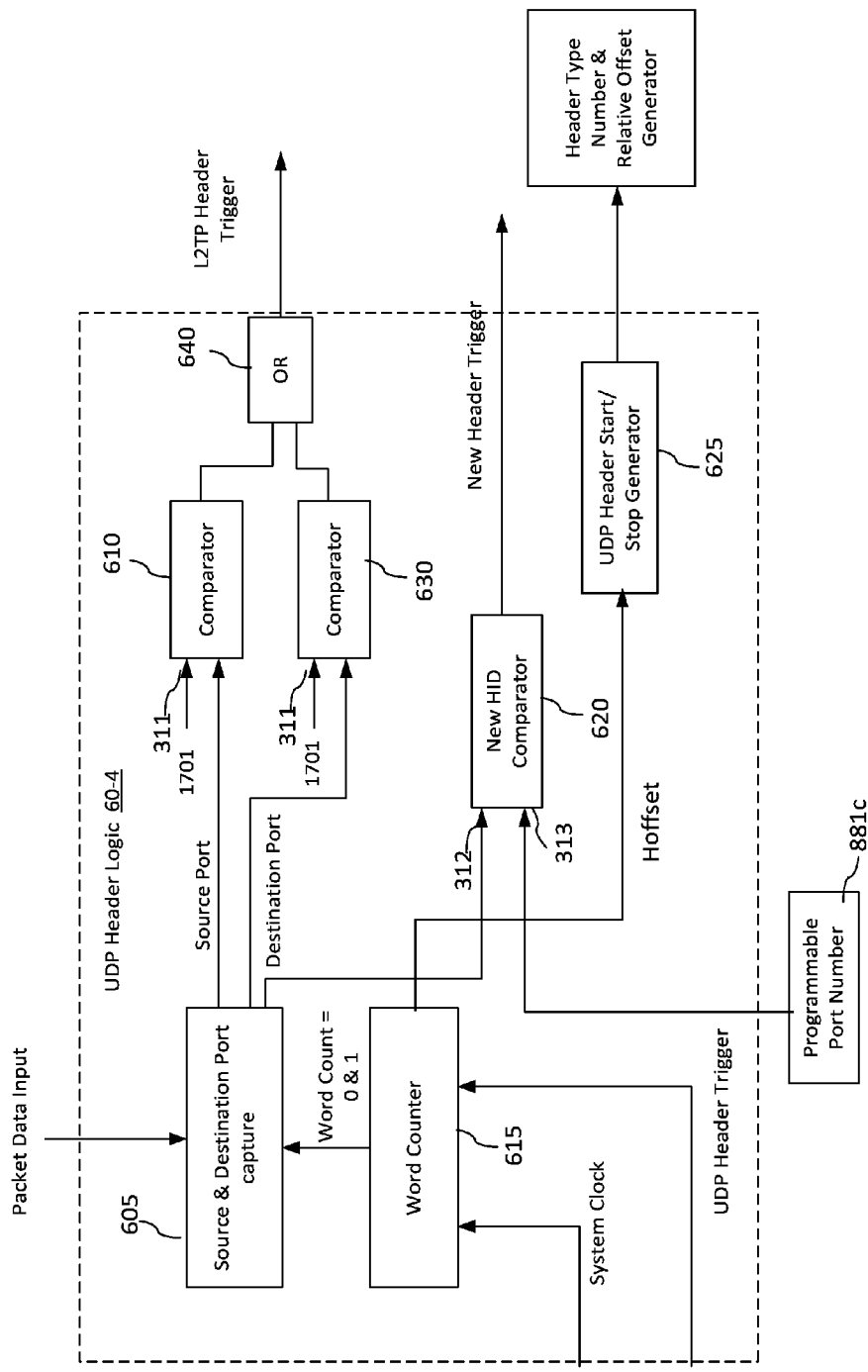
FIG. 10 is a schematic block diagram of a hybrid header parsing logic including hard-coded and reconfigurable portions for parsing 'default' Layer-4 headers.

With reference to FIG. 10, there is illustrated an embodiment of the DHL 60-4 that is configured for parsing UDP headers, and is referred to herein also as the UDPHL 60-4. A modification of this DHL for TCP headers would be minor at most and obvious to those skilled in the art. Similarly to the DHL 300, UDPHL 60-4 includes a word counter logic 615, a header start/stop generator 625, a set of default comparators 610, 630 with hard-coded reference inputs 311, and a programmable comparator 620 with a programmable reference input 313, which operate generally as described hereinabove with reference to DHL 300. One difference from the DHL 300 is that it is now the source port number and/or destination port number that are written in the UDP header that play the role of the next header ID (NHID), in that they provide information regarding the protocol the UDP header encapsulates, and hence regarding the next header following the UDP header. These port numbers are contained in the first and second words of the UDP header. Accordingly, the UDPHL includes a source & destination port capture logic 605, which receives the packet data and captures the source and destination port numbers therefrom upon receiving respective strobe signals from the word counter logic 615, which is configured to generate the strobe signals at the first and second words of the UDP header. The captured source and destination port numbers are then sent to data inputs of the source port comparators 610 and the destination port comparators 630, each having a reference input 311 hard-coded with one of known port numbers for a set of second default headers that may follow the UDP header 140. Note that for the sake of clarity FIG. 10 shows only single instances of the comparators 610, 620, which reference inputs are hard-coded with source and destination port numbers '1701' assigned to an L2TP header by way of example. Outputs of the comparators 610 and 620 are connected with an OR circuit 640, so that if the L2TP port number '1701' is detected at the data input of any of them, the UDPLH 60-4 outputs an L2TP Header trigger to trigger an L2TP header logic (not shown in FIG. 4) to start parsing the input packet.

The reconfigurable portion of the UDPHL 60-4 includes the programmable comparator 620, which data port receives the captured source or destination port number from 605, and the programmable reference port 313 is coupled to the programmable Port Number register 881c. In another embodiment, the reconfigurable portion of the UDPHL 60-4 may include two programmable comparators connected at the output port with an OR circuit similar to the comparator arrangement 610/630/640 for default port numbers, with the reference ports of the programmable comparators connected to two programmable registers 881c containing new source and destination port numbers.

The operation of the CPHP 10 has been described hereinabove with reference to parsing Ethernet packets 100 having a new header 120 sandwiched between a MAC header 110 and an IPv4 header 130. However, it will be appreciated that the CPHP 10 may be configured for parsing a plurality of other new header types, including but not limited to those that may be defined by EtherType, IP Protocol type, and port number values. Furthermore, CPHP 10 may also be configured to parse packets comprising two or more new headers, including when one new header is followed by another new header.

Figure 11:
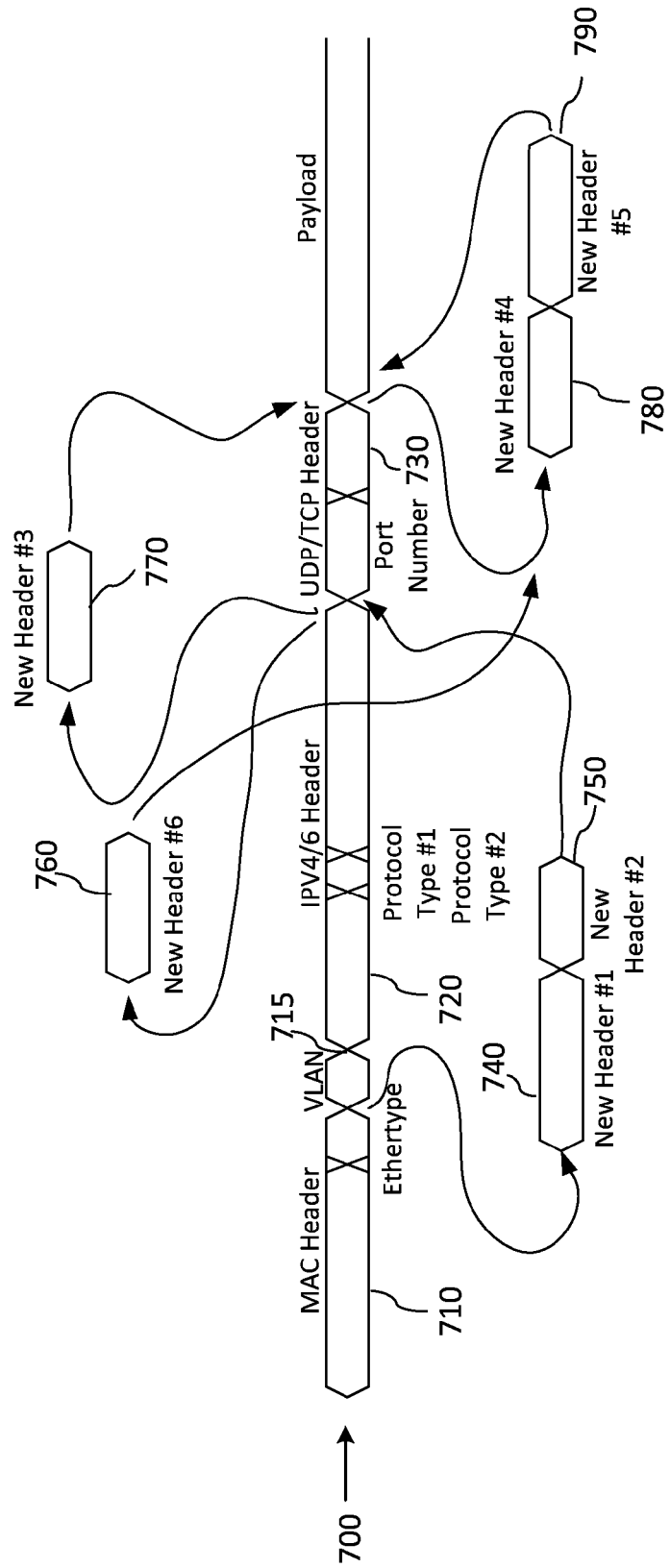
FIG. 11 is a schematic diagram illustrating few exemplary header stack configurations with up to five new headers that may be supported by embodiments of the present invention.

With reference to FIG. 11, there are illustrated by way of example several of many possible header configurations that can be supported by embodiments of the CPHP 10 of the present invention. The header stack of an exemplary 'default' packet 700 includes 4 'default' headers, namely a MAC header 710, followed by an optional VLAN header 715, which is in turn followed by one of IPv4 or IPv6 headers 720, followed by one of a UDP or TCP header 730, all parsable by the hard-coded state machine of the CPHP 10 implemented by the hard-coded portions of the DHLs 60. Although not shown in FIG. 4, a VLAN DHL can be easily implemented based on the DHL 300 and added to the CPHP 10. One skilled in the art will appreciate, based on the description given hereinabove, that CPHP 10 may be easily configured, such as by means of a command packet containing suitable CPHP configuration information as described hereinabove, to handle additional new headers, such as the five new headers 740, 750, 760, 770, 780 and 720, which may be inserted between or in place of any of the 'default' headers, for example in any of the multiple header configurations indicated in FIG. 11 by means of curved arrows.

Another aspect of the present invention provides an EEPROM (Electrically Erasable Programmable Read-Only Memory) based command parser 800, which will now be described with reference to FIG. 12. Such parser may be useful, for example, in network probes of a network monitoring system, such as SFProbe™ of JDSU PacketPortal™ architecture, which are described in "White Paper: The PacketPortal-Enabled SFProbe and How it Differs from a Standard SFP Transceiver", which is available from the same JDSU website. The PacketPortal™ uses SFProbes as intelligent packet director (IPD) transceivers to collect packets from Gigabit Ethernet networks. They can be distributed anywhere where standard SFP transceivers are used, including at access, edge and core routers of the network, allowing network operators and managers to access packet and data at any point in the network where SFPs are used.

In a typical system, the probes are discovered by the system server, and then the system control software starts the packet filter programming. However, the programming of an SFP probe may require tens of command packets, so that it takes time for the network monitoring application to be ready for the actual packet filtering. This initial programming for the probe may potentially cause a packet flooding problem on the network if many of the SFP probes are installed on the same network area. Since the system server needs to re-send the command packets after the probe becomes un-discoverable, the packet flooding may become an issue. A probe may also be undiscoverable due to particularities of the networking infrastructure. In this case, the probe cannot be used for the network monitoring application.

The present invention provides an EEPROM-based solution to this problem, wherein a network device upon startup may be programmed either remotely by means of command packets received over the network, or may also accept commands from a locally connected and suitably pre-programmed EEPROM, such as when the device is in the 'un-discover' mode, so that the remote system server does not have to send the commands that are already issued by the probe itself. By way of example, when an SFP probe is connected at a location which the system controller cannot discover, a suitable EEPROM based command can be loaded to enable the probe to start a desired filtering procedure by itself.

Figure 12:
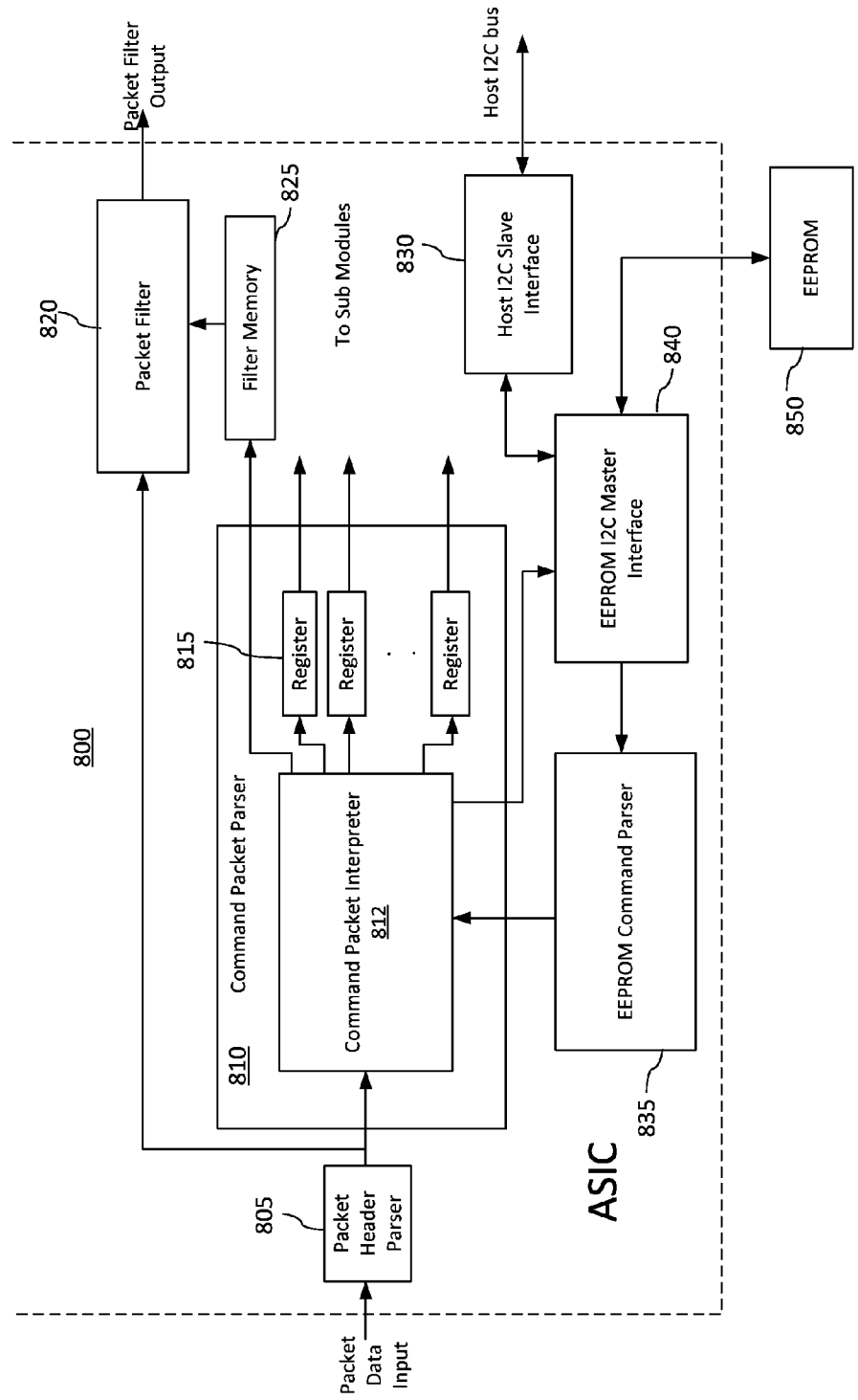
FIG. 12 is a schematic block diagram illustrating an EEPROM based command parser.

FIG. 12 shows a block diagram of a portion of an exemplary network device 800, such as network probe, which incorporates EEPROM based command parsing in accordance with an embodiment of the invention. A command packet parser 810, which incorporates a command packet interpreter (CPI) 812 and a plurality of programmable registers 815, can accept and parse any command packet received over the Ethernet, or from an EEPROM Command Parser 835, and save command parameters or/and associated data in registers 815 or in external memory 825. Command packets received over the Ethernet connection may be first passed through a PHP 805, which may be embodied for example as described hereinabove with reference to FIGS. 4-10. Various functional sub-modules of the probe, of which only packet filter 820 is shown, may then use data saved in registers 815 or directly in sub-module memory 825 to perform various device functions, such as but not exclusively filtering of packets that satisfy certain criteria as defined by the saved command data. The EEPROM based command parsing is realized by the EEPROM command parser 835, EEPROM I2C interface 840, and EEPROM 850, which may be separate from an ASIC chip implementing CPP 810. The EEPROM I2C interface 840 communicates data to/from the external EEPROM chip 850. Data read from EEPROM 850 is sent to EEPROM command parser 835 to translate EEPROM based commands to command format that can be interpreted by the CPI 812.

The programming of probe commands into the EEPROM may be done either by an off-line I2C programmer through the Host I2C interface 830 on the probe connector (not shown), or by a command packet received over the Ethernet. The command packet received over the Ethernet is first parsed by the packet header parser 805, and then forwarded to the CPP 810 for command and command parameters extraction. These command packets may carry specific EEPROM-programming commands that can be used to program the EEPROM via the EEPROM I2C interface 840, so no on-site visit by a technician may be required to program the EEPROM 850.

By way of example, the function of the packet filter 820 is a real time data comparison on the incoming packet data with an expected data pattern. Further by way of example, the packet filter block 820 is to be programmed to output only packets having a particular MAC destination address 'MAC_DST', a particular IPV4 source port 'IP_SRC', and a particular UDP source address 'UDP_SRC'.

EEPROM 850 may then be programmed with a specific filter command word with the MAC destination address value 'MAC_DST', the IPV4 source port value 'IP_SRC', the UDP source address value 'UDP_SRC', and the filter/sub-module/memory identifier 'SMID' as the command parameters, using a suitable EEPROM command format. The EEPROM command parser 835, which may be configured to read device-related commands programmed into the EEPROM 850 when the device 800 is powered on, extracts the filter command word and the command parameters 'MAC_DST', 'IP_SRC', 'UDP_SRC', 'SMID' from the EEPROM 850, and passes the command word and the command parameters to CPI 812 in a format interpretable by CPI 812. CPI 812 then programs the corresponding registers or sub-module memory as defined by the command with the command parameters, in this particular example—it programs the filter memory 825 with the MAC destination address value 'MAC_DST', the IPV4 source port value 'IP SRC', the UDP source address value 'UDP_SRC'.

It will be appreciated that the description hereinabove is just one example of the EEPROM based command execution. The EEPROM based command execution may be realized for any of the device-related commands available over the Ethernet.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications, including but not limited to embodiments combining elements or features of different embodiments described hereinabove with reference to FIGS. 4-12, are considered to be within the scope and spirit of the present invention as defined by the following claims.

I claim:

1. A configurable packet header parser (CPHP), comprising:
   a command packet parser configured to:
      receive a command packet from a network,
      identify the command packet, and
      parse the command packet,
         the command packet including configuration data for the CPHP;
   a plurality of programmable memory registers coupled to the command packet parser, each of the plurality of programmable memory registers configured to:
      store the configuration data; and
   a reconfigurable packet parsing engine (RPPE) coupled to the plurality of programmable memory registers, the RPPE configured to:
   parse a header of a data packet, received from the network, based on the configuration data stored in one or more of the plurality of programmable memory registers, the RPPE including:
      a hardcoded header parsing portion configured to:
         identify headers of a plurality of header types and header transitions in the data packet, and
         output header type numbers for the identified headers, and
      a programmable header parsing portion that includes one or more new header logics (NHLs), each of the one or more NHLs being coupled to one or more of the plurality of programmable memory registers.

2. The CPHP of claim 1, wherein the command packet parser is configured to extract at least one new header type descriptor (HD) from the command packet, and
   wherein the plurality of programmable memory registers includes one or more programmable HD registers for storing the at least one new header type descriptor.

3. The CPHP of claim 2, wherein the at least one new header type descriptor includes a header type identifier (HID) and a next header type descriptor (NHD), and
   wherein the plurality of programmable memory registers include one or more programmable NHD registers for storing the next header type descriptor, and one or more programmable HID registers for storing the header type identifier.

4. The CPHP of claim 3, wherein the at least one new header type descriptor includes a header type number (HN) and header length (HL) data, and
   wherein the plurality of programmable memory registers include at least one programmable HN register for storing the header type number for the new header type descriptor, and at least one programmable HL register for storing the header length data.

5. The CPHP of claim 1, wherein each of the one or more NHLs is coupled to a respective programmable HD register of one or more programmable HD registers.

6. The CPHP of claim 3, wherein:
   the hardcoded header parsing portion comprises a plurality of default header logics (DHLs), each of the plurality of DHLs configured to:
      parse the headers of the plurality of the header types,
      identify header transitions associated with the headers, and
      trigger a next one of the plurality of DHLs to parse a next header of the plurality of the header types in accordance with the identified header transitions; and
   the programmable header parsing portion includes a programmable comparator coupled to one of the one or more NHLs and to one of the one or more programmable HD registers, the programmable comparator configured to:
      trigger next header parsing by the one of the one or more NHLs when a next header identifier field of one of the headers corresponds to a HID value stored in the one of the one or more programmable HID registers.

7. The CPHP of claim 1, comprising:
   a plurality of default header logics (DHLs) configured to parse the headers of the plurality of header types, the plurality of DHLs including:
      a first DHL configured to parse headers with a first header type of the plurality of header types, and
      a plurality of second DHLs configured to parse headers with a plurality of second header types, of the plurality of header types, based on a trigger from the first DHL,
         wherein header type identifiers of the first header type and header type identifiers of the plurality of second header types are hardcoded in the first DHL and the plurality of second DHLs.

8. The CPHP of claim 7, wherein the first DHL comprises a plurality of hardcoded comparators configured to compare a next header identifier field, of a first header, to the plurality of second header types.

9. The CPHP of claim 8, wherein each of the plurality of hardcoded comparators includes a header type identifier value of one of the plurality of second header types.

10. The CPHP of claim 7, wherein each of the plurality of DHLs comprises:
a word counter configured to detect an end of a new header in the data packet and generate an end-header trigger, and
a trigger distributer configured to direct the end-header trigger to one of the plurality of second DHLs.

11. The CPHP of claim 10, wherein at least one of the plurality of DHLs comprises a header length calculator configured to:
determine a length of the new header, and
provide a header length value to the word counter to detect the end of the new header.

12. The CPHP of claim 11, wherein the header length calculator is configured to determine the length of the new header by adding, to a header length, a length increment value multiplied by a multiplier value.

13. The CPHP of claim 2, wherein the one or more programmable HD registers comprise at least one of:
a programmable Ethertype register for storing an Ethertype descriptor for a new header,
a programmable Protocol type register for storing an IP Protocol type descriptor for a new header, or
a programmable port number register for storing a new port number descriptor for a new header.

14. A method comprising:
receiving, from a network and by a packet header parser of a network device, a command packet hat includes configuration data associated with parsing headers;
parsing, by the packet header parser, the command packet to extract the configuration data;
storing, by the network device the configuration data in a plurality of programmable memory registers of the packet header parser;
receiving, by the network device, data packets from the network; and
parsing, by the packet header parser, headers of the data packets based on the configuration data stored in the plurality of programmable memory registers,
the packet header parser including a hardcoded header parsing portion and a programmable header parsing portion, and
the method further comprising:
identifying, by the hardcoded header parsing portion, headers of the data packets that include at least one of a plurality of header types,
outputting header type numbers for the identified headers, and
parsing additional headers of the data packets, other than the identified headers, with the programmable header parsing portion.

15. The method of claim 14, wherein the configuration data includes a new header type descriptor that includes:
a header type identifier,
a next header type descriptor,
a header type number, and
header length data.

16. The method of claim 14, wherein parsing the headers of the data packets includes:
parsing the headers of the data packets that include at least one of the plurality of the header types;
identifying header transitions associated with the headers of the data packets that include at least one of the plurality of the header types; and
triggering a parsing of a next header, of the headers of the data packets that include at least one of the plurality of the header types, based on the identified header transitions.

17. A network device, comprising:
packet header parser configured to:
identify a command packet from a network;
parse the command packet,
the command packet including configuration data for the packet header parser;
store the configuration data in a plurality of programmable memory registers;
receive data packets from the network,
identify, by a hardcoded header parsing portion of the packet header parser, headers of the data packets that include at least one of a plurality of header types;
output, by the hardcoded header parsing portion, header type numbers for the identified headers; and
parse, by a programmable header parsing portion of the packet header parser, additional headers of the data packets, other than the identified headers, based on the configuration data stored in the plurality of programmable memory registers.

18. The network device of claim 17, wherein the configuration data includes a new header type descriptor that includes:
a header type identifier,
a next header type descriptor,
a header type number, and
header length data.

19. The network device of claim 17, wherein the packet header parser is configured to:
parse the headers of the data packets that include at least one of the plurality of the header types;
identify header transitions associated with the headers of the data packets that include at least one of the plurality of the header types; and
trigger a parsing of a next header, of the headers of the data packets that include at least one of the plurality of the header types, based on the identified header transitions.

20. The network device of claim 17, wherein the packet header parser includes a plurality of default header logics (DHLs) to parse the headers of the data packets that include at least one of the plurality of header types, the plurality of DHLs including:
a first DHL configured to parse headers with a first header type of the plurality of header types, and
a plurality of second DHLs configured to parse headers with a plurality of second header types, of the plurality of header types, based on a trigger from the first DHL.

* * * * *

UNITED STATES PATENT AND TRADEMARK OFFICE
CERTIFICATE OF CORRECTION

PATENT NO.        : 9,282,173 B2
APPLICATION NO.   : 13/770505
DATED             : March 8, 2016
INVENTOR(S)       : Takashi Hidai Page 1 of 1

It is certified that error appears in the above-identified patent and that said Letters Patent is hereby corrected as shown below:

Claims

Please correct Claim 14 as follows:

Column 17, line 27, change "A method comprising:" to --A method, comprising:--.
Column 17, line 29, change "a command packet hat" to --a command packet that--.

Signed and Sealed this
Fourteenth Day of June, 2016

Michelle K. Lee
*Director of the United States Patent and Trademark Office*